W. H. THURMAN.
METHOD OF CONNECTING LUMBER FOR TRANSPORTATION IN FLUMES, &c.

No. 187,681. Patented Feb. 20, 1877.

Witnesses
Geo H Strong
J. W. L. Boone

Inventor
William H Thurman
Dewey &
Attys.

UNITED STATES PATENT OFFICE.

WILLIAM H. THURMAN, OF BORDEN, CALIFORNIA.

IMPROVEMENT IN METHODS OF CONNECTING LUMBER FOR TRANSPORTATION IN FLUMES, &c.

Specification forming part of Letters Patent No. 187,681, dated February 20, 1877; application filed October 27, 1876.

*To all whom it may concern:*

Be it known that I, WILLIAM H. THURMAN, of Borden, county of Fresno, and State of California, have invented an Improved Method of Running Lumber in Flumes; and I do hereby declare the following to be a full, clear, and exact description thereof, reference being had to the accompanying drawings.

My invention relates to a novel method of running lumber in flumes; and it consists in uniting a quantity of lumber together by clamps, so as to make a large mass, and then uniting these lengths by ropes, or otherwise, into a gang, which will move down the flume without overriding or becoming jammed.

The usual method of running lumber is to place the separate pieces into the flume, and allow them to run down by the force of the current; but it is found in practice that the lighter boards and pieces will soon overtake the heavier sticks and partially override them, and in this way several lengths may have their ends locked in time so as to form a more or less rigid mass, which will become jammed at turns or corners, and this necessitates the employment of a numerous force at long flumes, to keep them clear, besides greatly decreasing the capacity of the flume.

Figure 1:
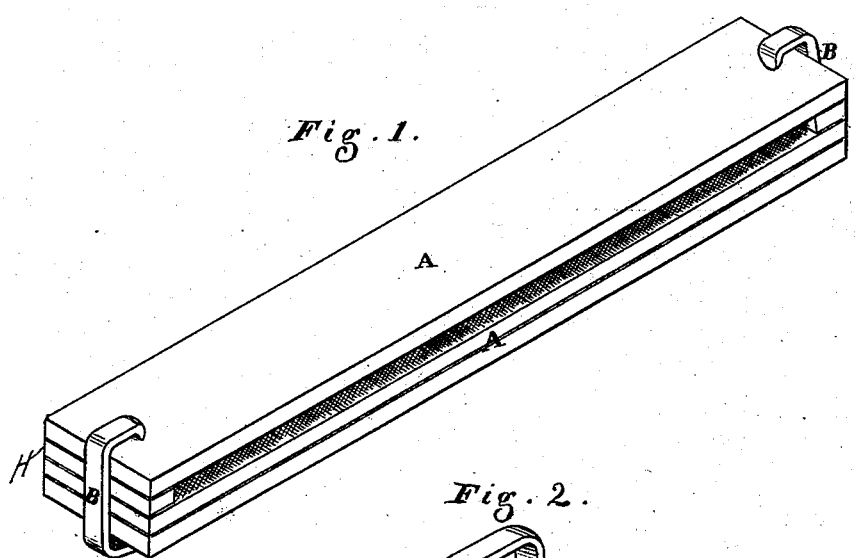
Figure 2:
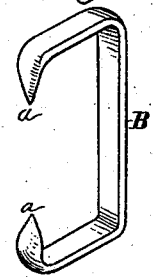
Figure 3:
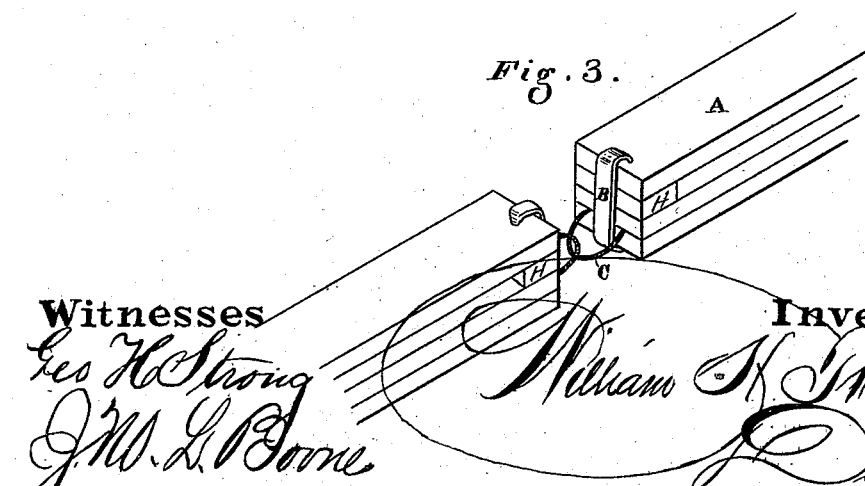

In my invention I take any lumber which I may have ready to send down, and pile it together in lengths, A A, until I have accumulated a bulk suitable to the carrying capacity of the flume. This pile is then secured together in any suitable manner; but I have found a very satisfactory method to be in the employment of a clamp, B. This clamp is made of iron of suitable strength, having a body a little longer than the thickness of the pile of lumber to be fastened together. The ends are bent so as to extend at right angles with the body and inclose the pile, and these ends have sharpened points *a a*, bent down as shown in Figure 2.

The pile of lumber being made up, the clamps are slipped over the ends, and I then take a piece of wood, H, of suitable thickness to form a key, and drive it between any two of the pieces composing the pile. This key forces the pile apart, so that the points of the clamps will be firmly secured in the outer boards of the pile, and the whole mass will be bonded securely together.

In order to unite these piles into a gang, I take pieces of rope C, and make a knot in each end. These knots are placed between the boards of any pile, and when the pile is keyed up the ropes form a loop projecting from the ends of the piles. These loops from the consective piles, being connected, will unite the whole into a gang of any desired length, and these gangs will so fill the flume that they will run down in regular order and never become jammed.

It will not be necessary, in making up the piles, to select lumber of any particular size, and the lengths may vary somewhat, it being only necessary to have the outside pieces of the pile the longest.

Another advantage derived from my method is, that I am enabled to move green heavy lumber, which will not float, by putting it into piles with a certain proportion of dry lumber, so that the whole pile will have sufficient buoyancy to float. If the lumber is too large to pile conveniently, single pieces may be united into a gang by making holes in their ends, inserting ropes, and then driving in plugs, so as to hold the ropes, or by using staples. Other methods for bonding the piles together may be employed; but I have found the clamps and keys best, as, by driving the keys out, the whole pile is loosened and left free at once, without wasting time. My method of uniting lumber into gangs is also valuable, as it regulates the speed, especially in crooked flumes.

I am aware that lumber has been floated down natural streams by binding logs together in rafts of any desired length; but this is not claimed as my invention.

Having thus described my invention, what I claim as new, and desire to secure by Letters Patent, is—

1. The method herein described for moving lumber in flumes, the same consisting in uniting the lumber into piles, and then binding it together by clamps, substantially as described.

2. The method herein described for uniting and bonding the piles of lumber, the same consisting of the clamps B, constructed to clasp the ends of the pile, and the keys H, the whole operating substantially as described.

3. The within-described method of uniting piles of lumber for transportation in flumes or artificial water-courses, when the same consists in the combination of the piles A A, clamps B B, and cords or ropes C C, in the manner and for the purpose herein set forth.

In witness whereof I have hereunto set my hand and seal.

WILLIAM HENRY THURMAN. [L. S.]

Witnesses:
   GEO. H. STRONG,
   MARK HOWELL.